UNITED STATES PATENT OFFICE.

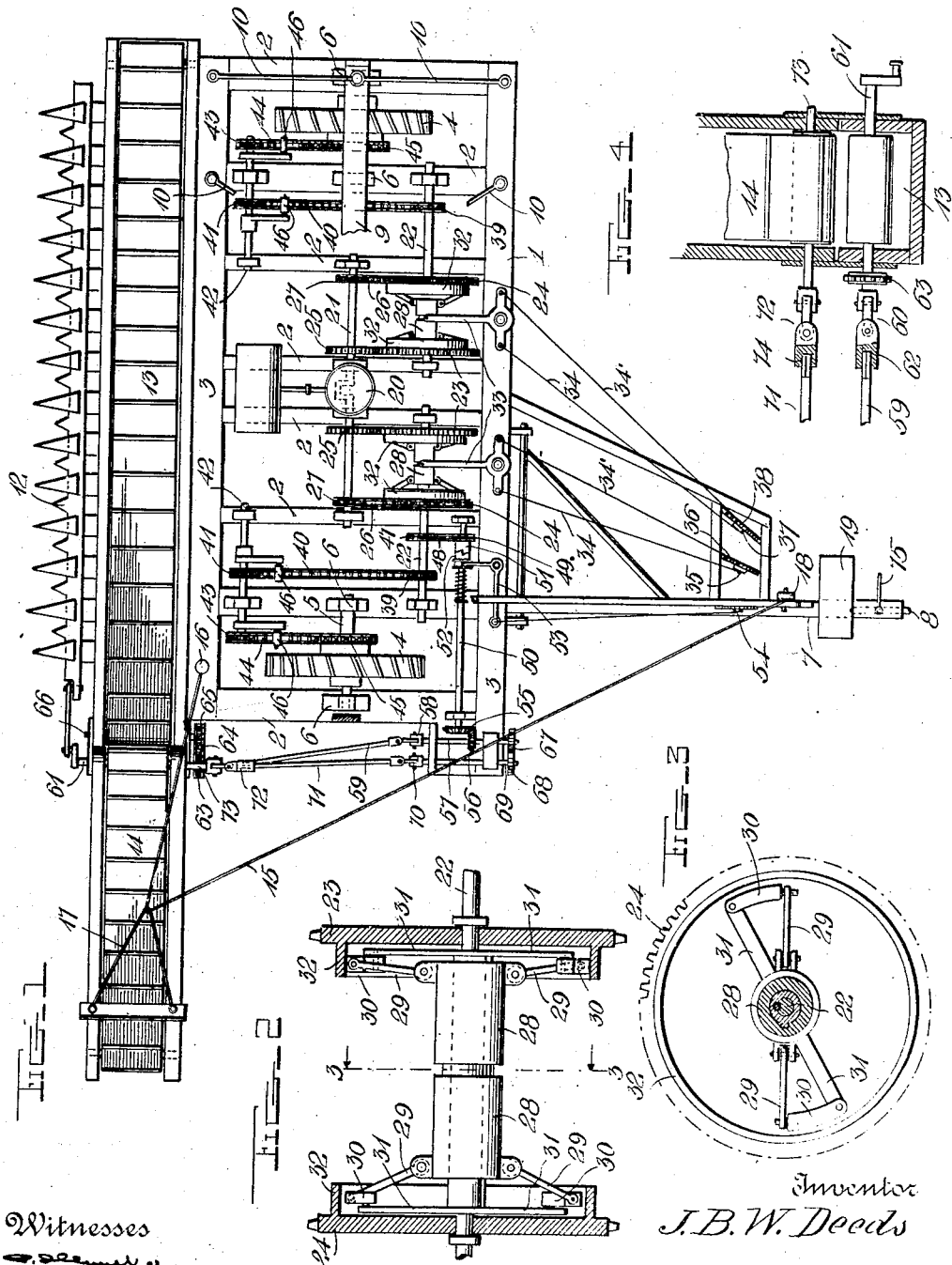

JAMES B. W. DEEDS, OF GLEN ELDER, KANSAS.

GRAIN-HARVESTING MACHINE.

No. 931,575.  Specification of Letters Patent.  Patented Aug. 17, 1909.

Application filed March 5, 1909. Serial No. 481,267.

*To all whom it may concern:*

Be it known that I, JAMES B. W. DEEDS, a citizen of the United States, residing at Glen Elder, in the county of Mitchell and State of Kansas, have invented certain new and useful Improvements in Grain-Harvesting Machines; and I do declare the following to be a full, clear, and exact description of the invention, such as will enable others skilled in the art to which it appertains to make and use the same.

This invention relates to improvements in grain harvesters and particularly to the class of harvesters in which the heads are cut from the standing grain while the machine is propelled over the field.

The object of the invention is to provide a machine of this character having an improved construction and arrangement of operating and propelling mechanism and means whereby the propelling mechanism may be quickly and easily reversed, means being also provided for throwing the operating mechanism out of engagement with the propelling mechanism.

With the foregoing and other objects in view, the invention consists of certain novel features of construction, combination and arrangement of parts, as will be more fully described and particularly pointed out in the appended claim.

In the accompanying drawings, Figure 1 is a plan view of a harvesting machine constructed in accordance with the invention;
Fig. 2 is a detail sectional view on an enlarged scale of the reversing clutches; Fig. 3 is a vertical transverse section taken on line 3—3 of Fig. 2; Fig. 4 is a fragmentary sectional view on an enlarged scale of the operating connections for the conveyer and elevating mechanism.

Referring more particularly to the drawings, 1 denotes the main supporting frame of the machine, said frame comprising a series of longitudinally disposed bars 2 which are connected at their opposite ends by front and rear cross bars 3. Between the two outer side bars at each end of the frame is arranged a traction wheel 4, said traction wheel being mounted on short shafts 5 journaled in suitable bearings 6 on the bars 2 of the frame.

On the rear end of the frame 1 is a rearwardly projecting extension frame 7, in the outer end of which is arranged the usual steering wheel 8. On the end bars 2 of the frame are arranged upwardly projecting standards, on the upper ends of which is secured a cross beam 9, said beam having connected thereto a series of brace rods 10, the lower ends of which are secured to the bars of the main frame thereby bracing and supporting the same.

On the front end of the main frame is arranged the usual sickle bar 12 and conveyer mechanism 13 whereby the severed heads of the grains are conveyed to the elevating mechanism 14 arranged at one end of the conveying mechanism, as shown. The elevating mechanism is hingedly connected to the end of the conveying mechanism in any suitable manner and is supported at its upper end and adapted to be raised or lowered to the desired elevation by means of a raising and lowering cable 15 which is connected at one end to a post 16 and engages a loop 17 on the elevator frame and from thence extends to the rear end of the extension frame 7 where it is secured to a post or standard 18 in convenient reach of the operator standing on the rear platform 19 of the machine.

Arranged in suitable position on the frame 1 is a motor which is here shown and is preferably in the form of a gasolene engine 20. The engine 20 is operatively connected to the main drive shaft 21 mounted in suitable bearings on the frame 1 of the machine. In each side or end of the machine are arranged the power transmitting mechanisms of the machine. These power transmitting mechanisms for the traction wheels are duplicated on opposite sides of the machine and each mechanism is independent from that at the opposite end of the machine, said propelling mechanisms being connected to opposite ends of the drive shaft 21.

The propelling mechanism comprises power transmitting shafts 22 which are revolubly mounted in suitably bearings in each side of the frame, as shown. On the shafts 22 are loosely mounted spur gear wheels 23 and sprocket gears 24. The gear wheels 23 are directly engaged with spur pinions 25 on the main drive shaft 21, while the sprocket gears 24 are connected by chains 26 to sprocket pinions 27, also fixedly mounted on the main drive shaft 21. By thus connecting the gears 23 and 24 with the main drive shaft, one of said gears will be driven in one direction and the other in the opposite direction. On the shafts 22 between the gears 23 and 24 is keyed to slide a clutch sleeve 28.

The clutch sleeves 28 are connected at their opposite ends by links 29 to clutch shoes 30 which are pivotally mounted on the outer ends of supporting bars 31 loose on the shafts 22. The clutch shoes 30 are adapted to be thrown into and out of frictional engagement with clutch rings or bands 32 secured on the inner faces of the sprocket gears 24 and spur gears 23 whereby when the sleeve 28 is shifted in one direction or the other, the clutch shoes will be tightened against the clutch ring of one of said gears and released from engagement with the other, thereby connecting one or the other of the gears to the power transmitting shafts 22. When the spur gears 23 are thus connected with the shafts 22, said shafts will be driven in one direction and when the sprocket gears 24 are thus connected to the shafts 22, the latter will be driven in the opposite direction.

With the clutch sleeves 28 are operatively engaged suitable shifting levers 33 which are pivotally mounted on the frame 31 and to the opposite ends of the levers 33 are connected operating rods 34 and 34' which extend back to the rear portion of the extension frame 7. The lever operating rods 34 and 34' of the lever on one side of the machine are connected to a hand lever 35 which is operatively mounted in the rear portion of the extension frame and is provided with a segmental rack 36 for holding the shifting lever in the desired position. The operating rods 34 and 34' of the clutch sleeve on the opposite side of the machine extend back to the rear end of the extension frame 7 and are connected with a hand lever 37 which is pivoted in said rear end of the extension frame and is adapted to engage a segmental rack 38 whereby the clutch sleeve on this side of the machine is held in its adjusted position.

On the shafts 22 in the opposite sides of the machine are mounted sprocket gears 39 which are connected by sprocket chains 40 to sprocket gears 41 on counter shafts 42 which are journaled in suitable bearings on the forward portion of the frame 1, as shown. On the outer ends of the shafts 41 are fixedly mounted sprocket gear pinions 43 which are connected by sprocket chains 44 to sprocket gears 45 secured to the hubs of the traction wheels 4, as shown. By thus connecting the traction wheels with the driving mechanism, the machine may be propelled and by means of the reversing clutch mechanisms hereinbefore described, the machine may be propelled in a forward or backward direction, as desired. The sprocket chains 40 and 44 are preferably provided with chain tightening devices 46 by means of which the slack in the chains may be readily taken up or adjusted.

On the power transmitting shaft 22 in the left hand side of the frame is fixedly mounted a sprocket gear pinion 47 which is connected by a sprocket chain 48 to a sprocket pinion 49 loosely mounted on the power transmitting shaft 50 which is journaled in suitable bearings in the rear portion of the frame, as shown. The sprocket pinion 49 has arranged thereon one member 51 of a clutch, the opposite member 52 of which is keyed to slide on the shaft 50 whereby when said clutch member 52 is shifted into engagement with the clutch member 51, the sprocket pinion 49 will be connected with the shaft 50 to operate the same. The clutch member 52 is provided with a spring to normally hold the same into engagement with the clutch member 51 and is adapted to be disconnected from said clutch member 51 to throw the shaft 50 out of gear by means of a bell crank shifting lever 53 which is pivotally mounted on the frame 1, as shown, and is connected to a hand lever 54 arranged on the extension 7 of the frame within convenient reach of the operator.

On the outer end of the shaft 50 is fixedly mounted a bevel gear 55 which is in operative engagement with a bevel gear pinion 56 mounted on a short shaft 57 journaled in suitable bearings on the end of the frame, as shown. The shaft 57 is connected by a universal joint 58 with a power transmitting shaft 59, the opposite ends of which are connected by a universal joint 60 to a sickle operating shaft 61 by means of which the sickle is reciprocated at the forward end of the machine. The shaft 59 is preferably formed in detachable sections, one of which is in the form of a socket 62 to receive the squared end of the other section of the shaft. On the sickle operating shaft 61 is arranged a sprocket gear 63 which is connected by a sprocket chain 64 to a sprocket gear 65 on the end of a conveyer operating shaft 66 by means of which the conveyer 13 is operated.

On the rear end of the shaft 57 is fixedly mounted a spur gear pinion 67, which is in engagement with a spur gear pinion 68 on the rear end of a short shaft 69 mounted in suitable bearings on the frame parallel with and adjacent to the shaft 57. To the inner end of the shaft 69 is connected by a universal joint 70, a power transmitting shaft 71, which is connected at its outer end by a universal joint 72 with an elevator operating shaft 73 by means of which the elevator is operated to elevate the heads of grain from the conveyer to the wagon or receptacle provided to receive the same. The shaft 71 is preferably formed in detachable sections one of which is in the form of a socket 74 to receive the squared end of the opposite section, whereby the shaft may be readily separated. By forming the shafts 59 and 71 in detachable sections, the sickle, conveyer and elevator mechanism may be readily removed from the machine when desired.

On the frame 1 may be arranged a water tank and a gasolene tank, which are suitably connected to the engine. The steering wheel is provided with the usual handle or rod 75 by means of which the machine is steered in the desired direction.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claim.

Having thus described my invention, what I claim is.

In a harvesting machine of the character described, a supporting frame, traction wheels revolubly mounted in said frame, a motor, an independent power transmitting mechanism connected with each of said traction wheels, and with said motor whereby the machine is propelled, independently operated reversing mechanisms in said power transmitting mechanisms, a grain sickle, a conveyer in the rear of the sickle an elevating mechanism connected with said conveyer, power transmitting shafts to operatively connect said sickle, conveyer and elevator mechanism with the propelling mechanism for one of said traction wheels, and a clutch mechanism to throw said power transmitting shafts into and out of gear with said propelling mechanism.

In testimony whereof I have hereunto set my hand in presence of two subscribing witnesses.

JAMES B. W. DEEDS.

Witnesses:
ANDY WALKER,
L. S. HADLEY.